Figure 1:
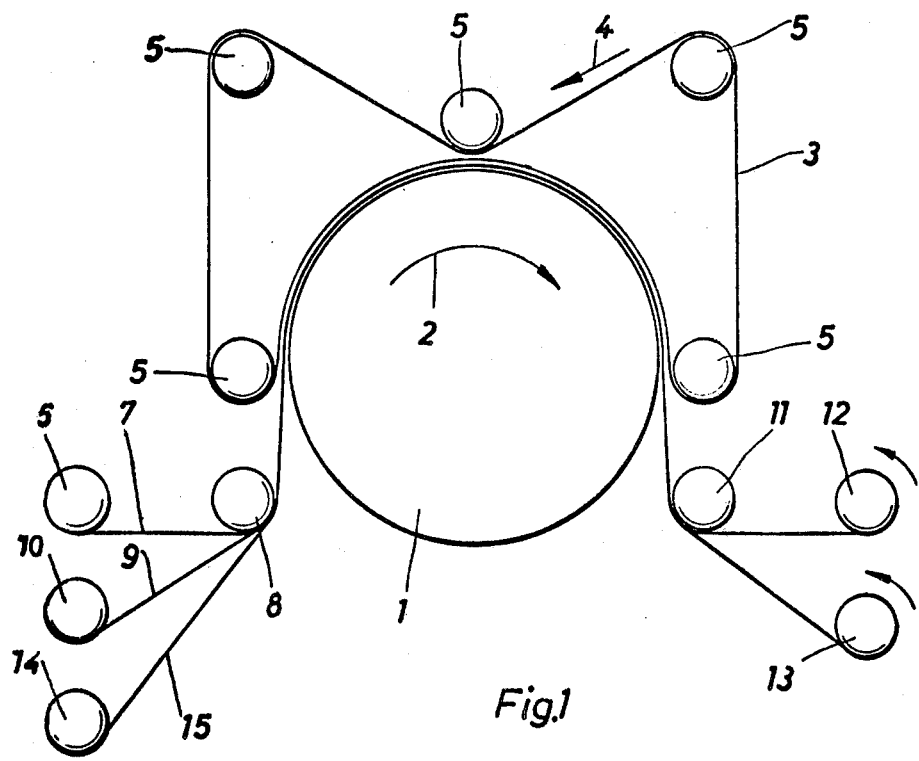

United States Patent [19]
Metzger

[11] 4,161,563
[45] Jul. 17, 1979

[54] PRINTED TEXTILE WEB MATERIAL

[75] Inventor: Gerhard Metzger, Haibach b. Aschaffenburg, Fed. Rep. of Germany

[73] Assignee: Transfertex Thermodruck-system GmbH, Kleinostheim, Fed. Rep. of Germany

[21] Appl. No.: 887,923

[22] Filed: Mar. 20, 1978

Related U.S. Application Data

[62] Division of Ser. No. 779,301, Mar. 21, 1977.

[51] Int. Cl.² .............................................. B32B 29/02
[52] U.S. Cl. .................................... 428/233; 428/236; 428/246; 428/346; 428/354; 428/914
[58] Field of Search ............... 428/236, 246, 248, 284, 428/346, 354, 906, 914, 233

[56] References Cited

U.S. PATENT DOCUMENTS

| 2,274,851 | 3/1942 | Schneider | 428/236 |
| 3,323,974 | 6/1967 | Jablonski | 428/236 |
| 3,616,146 | 10/1971 | Gabet | 418/354 |
| 3,715,264 | 2/1973 | Burton | 428/236 |
| 3,790,439 | 2/1974 | La Perre et al. | 428/346 |
| 4,054,697 | 10/1977 | Reed et al. | 428/354 |
| 4,082,890 | 4/1978 | Burton et al. | 428/354 |

Primary Examiner—James J. Bell
Attorney, Agent, or Firm—Marvin Feldman; Stephen E. Feldman

[57] ABSTRACT

A printed textile web material and apparatus and method for making same is disclosed wherein web material comprises a heat-transferred printed face and an unprinted face and a paper web is adhesively bonded to the unprinted face. In making the web material, the printing and bonding are done simultaneously. The printed textile web is particularly suited for application to walls.

6 Claims, 2 Drawing Figures

PRINTED TEXTILE WEB MATERIAL

This is a division, of application Ser. No. 779,301, filed Mar. 21, 1977.

This invention relates to a printed textile web material and to a method and apparatus for producing the same.

For some years it has been known to print textile web material by bringing it into contact with a transfer paper under heat and pressure in a calender. The transfer paper bears suitable printing, so that the print is transferred from the transfer paper to the textile web material in the calender.

The problem underlying the present invention is that of further enlarging the possible applications of a printed textile web material of this kind.

For the purpose of solving this problem the printed textile web material of the invention is characterized in that its lower face is joined by an adhesive to a web.

A new product is thereby created, which consists of the textile web material printed by the aforesaid process and coated on its lower face by the paper web. Additional applications are thereby made possible, since the new material can be coated with a conventional adhesive for wallpapers and applied to walls. Textile hung walls can thus be obtained, which hitherto was not possible in such a simple manner. On the contrary the expedient has been adopted of stretching printed textile webs on walls by means of battens or other aids. Furthermore, such textile wall hangings can be replaced in a simple manner by tearing off the textile web, the paper web under it remaining on the wall. The wall can then be hung with a new material—wallpaper or textile material.

The production of a printed textile material of this kind is particularly simple if the adhesive bond between the paper web and the textile material is effected by means of a heat-activatable adhesive. This will be further explained below.

For the purpose in question it is best for the paper web to be a base paper for wall hanging.

The invention also comprehends a method for producing a printed textile web material of the said kind comprising the steps of bringing into contact with one face of a textile web of material a web of transfer paper and into contact with the other face a heat-activatable adhesive coated face of a web, and by applying heat and pressure to the contacting webs transferring a pattern to said one face of the textile web of material and bonding the web to the said other face of the textile web material. This method thus extends in a particularly favorable manner the previously described known method of transferring printing from a transfer paper to textile web material, by adhesively bonding the web to the rear face of the textile material simultaneously with this transfer.

The invention further comprehends an apparatus for carrying out the said method, which apparatus comprises a calender arranged to apply heat and pressure to material passed there-through, a transfer paper web magazine reel, a textile web of material magazine reel, a heat-activatable coated web magazine reel, and between the calender and the magazine reels a deflecting roller round which the webs pass from the reels to the calender with the transfer paper web in contact with one face of the textile web material and the heat-activatable adhesive coated face of the web in contact with the other face of the textile web material.

Figure 2:
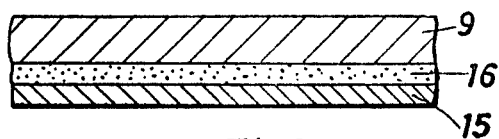

The invention will now be described, by way of example, with reference to the accompanying drawing in which:

FIG. 1 shows diagrammatically a view of a machine for producing a printed textile web material according to the invention; and FIG. 2 shows to an enlarged scale, and diagrammatically, a section through the web material.

Referring to the drawing, a calender roll 1 is rotated in the direction of the arrow 2 by means of a drive not shown in the drawing. Over a peripheral angle of about 180° a pressure belt 3, which is moved in the direction of the arrow 4, bears against the surface of the calender roll. The pressure belt is guided over deflecting rollers 5. The calender roll 1 is heated to a temperature between about 210° and 300° C.

From a first magazine reel 5 a printed transfer paper 7, passing round a deflecting roller 8, is introduced into the gap between the surface of the calender roll 1 and the pressure belt 3. Textile web material 9 from a second magazine reel 10 is likewise passed round the deflecting roller 8 into the calender gap, bearing against the transfer paper 7. Through the application of heat and pressure the printing is transferred in the calender from the transfer paper 7 to the upper face of the textile web material.

On the outlet side of the calender the used transfer paper 7 is passed by way of another deflecting roller 11 to a winding reel 12, onto which it is wound and is then destroyed. The printing textile web material 9 is wound onto another winding reel 13 after first being guided round the deflecting roller 11.

The components of the calender described so far are known.

According to the invention a third magazine reel 14 is provided, on which is disposed a paper web 15 whose upper face directed towards the textile web material is coated with a heat-activatable adhesive 16 (see also FIG. 2). This paper web is introduced into the calender together with the webs 7 and 9, and in the calender the heat-activatable adhesive is activated by the application of heat and pressure, so that the paper web is bonded to the unprinted face of the textile web material.

The new product shown diagrammatically in section in FIG. 2 and which consists of the printed textile web material 9 on whose unprinted face the paer web 15 is adhesively bonded by means of the heat-activatable adhesive 16, is therefore wound onto the winding reel 13.

What is claimed is:

1. A textile web material comprising a roll of textile, said textile having a heat-transfer printed face and an unprinted face, and a roll of a backing web, wherein said unprinted textile face is bonded by a heat-activatable adhesive to said backing web, whereby said material when unrolled provides a heat applied textile wall covering, and said textile can be peeled from said backing web with the covering applied to the wall.

2. The textile web material of claim 1, wherein said backing web is paper.

3. A composite web material comprising, a textile web, a web of heat transfer paper contacting one face of the textile web, and a backing web bonded to the other face of the textile web.

4. The web of claim 3, wherein the bond is an adhesive bond.

5. The web of claim 4, wherein the bond is a heat-activatable adhesive.

6. The web of claim 5, wherein the backing web is a base paper.

* * * * *